(12) United States Patent
Nishiura

(10) Patent No.: US 12,735,577 B2
(45) Date of Patent: Sep. 15, 2026

(54) PHOTOCURABLE RESIN COMPOSITION AND METHOD FOR MANUFACTURING THREE-DIMENSIONAL OBJECT

(71) Applicant: CANON KABUSHIKI KAISHA, Tokyo (JP)

(72) Inventor: Chiaki Nishiura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 18/353,730

(22) Filed: Jul. 17, 2023

(65) Prior Publication Data

US 2024/0026163 A1 Jan. 25, 2024

(30) Foreign Application Priority Data

Jul. 20, 2022 (JP) ................................ 2022-115655
Apr. 25, 2023 (JP) ................................ 2023-071495

(51) Int. Cl.

| | |
|---|---|
| ***C09D 4/06*** | (2006.01) |
| ***B29C 64/135*** | (2017.01) |
| ***B29C 64/30*** | (2017.01) |
| ***B29K 33/00*** | (2006.01) |
| ***B29K 67/00*** | (2006.01) |

(Continued)

(52) U.S. Cl.
CPC .............. *C09D 4/06* (2013.01); *B29C 64/135* (2017.08); *B29C 64/30* (2017.08); *B33Y 10/00* (2014.12); *B33Y 40/20* (2020.01); *B33Y 70/00* (2014.12); *B33Y 70/10* (2020.01); *C09D 7/65* (2018.01); *C09D 7/68* (2018.01); *C09D 7/69* (2018.01); *C09D 133/14* (2013.01);
(Continued)

(58) Field of Classification Search
CPC . B29C 64/135; B29C 64/30; B29C 2791/009; B29K 2033/26; B29K 2067/04; B33Y 10/00; B33Y 40/20; B33Y 70/00; B33Y 70/10; C09D 4/06; C09D 7/65; C09D 7/68; C09D 7/69; C09D 133/14; C09D 133/26
See application file for complete search history.

(56) References Cited

U.S. PATENT DOCUMENTS

2015/0051123 A1 2/2015 Karaki et al.
2015/0275125 A1* 10/2015 Karaki ...................... C08F 2/48 411/378

(Continued)

FOREIGN PATENT DOCUMENTS

EP 3711950 A1 9/2020
EP 3872105 A1 * 9/2021 ........... B29C 64/124

(Continued)

*Primary Examiner* — James C Goloboy
(74) *Attorney, Agent, or Firm* — Canon U.S.A., Inc. IP Division

(57) ABSTRACT

In a photocurable resin composition containing a polyfunctional radically polymerizable compound (A), a monofunctional radically polymerizable compound (B), and a curing agent (D), the polyfunctional radically polymerizable compound (A) has an ethylenically unsaturated group equivalent of 700 g/eq or more and 7,000 g/eq or less, and fluororesin particles (C) are added in an amount of 5 parts or more by mass and 30 parts or less by mass based on a total of 100 parts by mass of the polyfunctional radically polymerizable compound (A) and the monofunctional radically polymerizable compound (B).

17 Claims, 1 Drawing Sheet

(51) Int. Cl.

| | |
|---|---|
| ***B33Y 10/00*** | (2015.01) |
| ***B33Y 40/20*** | (2020.01) |
| ***B33Y 70/00*** | (2020.01) |
| ***B33Y 70/10*** | (2020.01) |
| ***C09D 7/40*** | (2018.01) |
| ***C09D 7/65*** | (2018.01) |
| ***C09D 133/14*** | (2006.01) |
| ***C09D 133/26*** | (2006.01) |

(52) U.S. Cl.

CPC ...... *C09D 133/26* (2013.01); *B29C 2791/009* (2013.01); *B29K 2033/26* (2013.01); *B29K 2067/04* (2013.01)

(56) References Cited

U.S. PATENT DOCUMENTS

| | | | | |
|---|---|---|---|---|
| 2019/0022826 | A1 | 1/2019 | Franke et al. | |
| 2019/0039290 | A1 | 2/2019 | Lebrun et al. | |
| 2020/0131385 | A1 | 4/2020 | Bartow et al. | |
| 2020/0180220 | A1 | 6/2020 | Nelson et al. | |
| 2021/0362297 | A1 | 11/2021 | Franke et al. | |
| 2024/0384088 | A1* | 11/2024 | Nishiura | B33Y 70/00 |

FOREIGN PATENT DOCUMENTS

| | | | | |
|---|---|---|---|---|
| JP | S6094468 | A | 5/1985 | |
| JP | 2004083822 | A | 3/2004 | |
| JP | 2014159556 | A | 9/2014 | |
| JP | 5882451 | B2 | 3/2016 | |
| JP | 2016056308 | A | 4/2016 | |
| JP | 2018141142 | A | 9/2018 | |
| JP | 2019189685 | A | 10/2019 | |
| JP | 2021024897 | A | 2/2021 | |
| JP | 2021084321 | A | 6/2021 | |
| JP | 2021084322 | A | 6/2021 | |
| WO | WO-2020209105 | A1 * | 10/2020 | B33Y 70/00 |

* cited by examiner

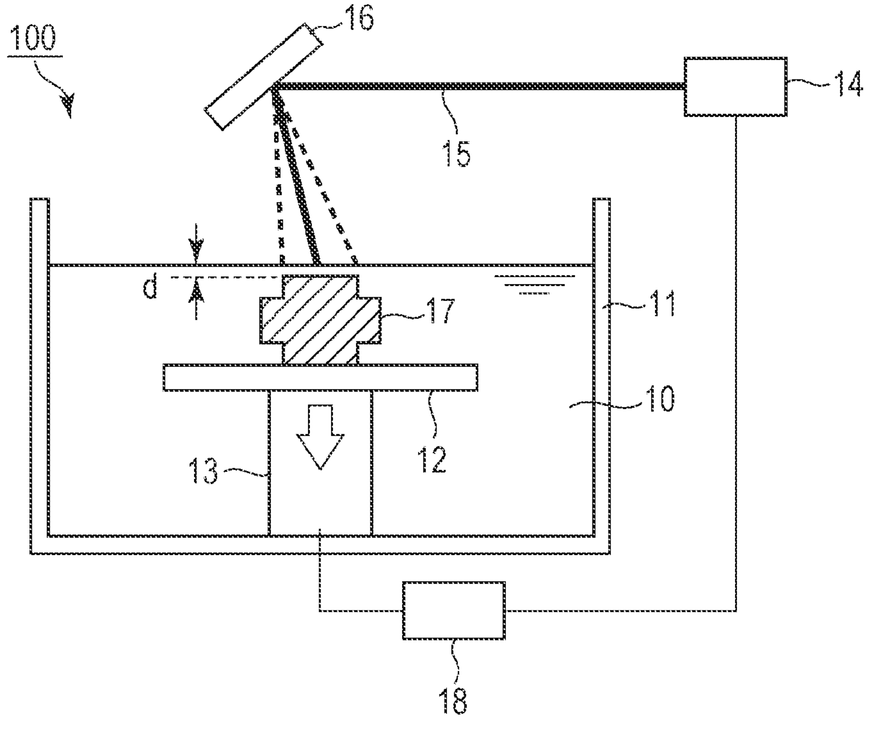
100
16
14
15
d
17
11
10
12
13
18

PHOTOCURABLE RESIN COMPOSITION AND METHOD FOR MANUFACTURING THREE-DIMENSIONAL OBJECT

BACKGROUND

Field of the Disclosure

The present disclosure relates to a photocurable resin composition for three-dimensional modeling and a method for manufacturing a three-dimensional object using the photocurable resin composition.

Description of the Related Art

As an example of the use of a liquid curable resin composition, an optical three-dimensional modeling method (stereolithography) has been intensively studied for manufacturing a desired three-dimensional object by curing a photocurable resin composition layer by layer with light, such as ultraviolet rays, and sequentially stacking the layers. Stereolithography enables modeling with higher accuracy than other methods. For this reason, the use of stereolithography is spreading beyond prototype modeling for shape verification (rapid prototyping) to the modeling of working models and molds for functionality verification (rapid tooling). Moreover the use of stereolithography is spreading to actual product modeling (rapid manufacturing).

In such circumstances, demands for photocurable resin compositions have become more sophisticated. For example, there is a demand for a photocurable resin composition capable of forming an article having mechanical properties, such as high rigidity and toughness, comparable to those of general-purpose engineering plastics.

Japanese Patent No. 5882451 discloses a photocurable resin containing a (meth)acrylate compound having an isocyanuric acid ring and polytetrafluoroethylene as a solid lubricant. A technique is disclosed for achieving a low coefficient of friction and high wear resistance in a machinable liner formed by applying the photocurable resin to a cylindrical sleeve composed of stainless steel and curing the resin. Japanese Patent Laid-Open No. 2014-159556 discloses a technique for achieving high elongation at break and high releasability from a PTFE sheet by photocuring a photocurable resin containing a (meth)acrylate compound and a water-insoluble surfactant.

SUMMARY OF THE DISCLOSURE

According to one aspect of the present disclosure, there is provided a photocurable resin composition, containing a polyfunctional radically polymerizable compound (A), a monofunctional radically polymerizable compound (B), and a curing agent (D), in which the polyfunctional radically polymerizable compound (A) has an ethylenically unsaturated group equivalent of 700 g/eq or more and 7,000 g/eq or less, the polyfunctional radically polymerizable compound (A) is contained in an amount of 20 parts or more by mass and 75 parts or less by mass based on a total of 100 parts by mass of the polyfunctional radically polymerizable compound (A) and the monofunctional radically polymerizable compound (B), fluororesin particles (C) are contained in an amount of 5 parts or more by mass and 30 parts or less by mass based on a total of 100 parts by mass of the polyfunctional radically polymerizable compound (A) and the monofunctional radically polymerizable compound (B), and the fluororesin particles (C) have an average particle size of 50 μm or less.

According to one aspect of the present disclosure, there is provided a cured product obtained by curing the photocurable resin composition according to one aspect of the present disclosure described above. According to one aspect of the present disclosure, there is provided a method for manufacturing a three-dimensional object using stereolithography, the method including the steps of:

disposing a photocurable resin composition in a layer, and irradiating the layered photocurable resin composition with light energy based on slice data of a shaping model to cure the layered photocurable resin composition, in which the photocurable resin composition is the photocurable resin composition according to one aspect of the present disclosure described above.

Further features of the present disclosure will become apparent from the following description of exemplary embodiments with reference to the attached drawing.

BRIEF DESCRIPTION OF THE DRAWINGS

FIGURE illustrates a configuration example of a stereolithography apparatus, according to one or more aspects of the subject innovation.

DESCRIPTION OF THE EMBODIMENTS

Cured products obtained by photocuring photocurable resin compositions are sometimes desired to have appropriate toughness as actual products and sliding properties, such as low coefficient of friction and high wear resistance, depending on the application. However, it is difficult to say that a photocurable resin composition satisfying these physical properties at the same time has been produced.

Japanese Patent No. 5882451 discloses high wear resistance; however, there is no consideration or disclosure regarding the toughness of the cured film. In Japanese Patent Laid-Open No. 2014-159556, the high releasability presumably implies a low coefficient of friction; however, there is no consideration or disclosure regarding wear resistance.

The present embodiment provides a photocurable resin composition for three-dimensional modeling, the photocurable resin composition enabling the modeling of an article having high toughness and good sliding properties.

Embodiments of the present disclosure will be described below. The embodiments described below are merely examples of the embodiments of the present disclosure, and the present disclosure is not limited to these embodiments.

Polyfunctional Radically Polymerizable Compound (A)

A polyfunctional radically polymerizable compound (A) contained in a photocurable resin composition (hereinafter, also referred to simply as a "curable resin composition" or "resin composition") for three-dimensional modeling according to the present embodiment is a compound having two or more radically polymerizable functional groups in its molecule. Examples of a radically polymerizable functional group include ethylenically unsaturated groups. Specific examples include a (meth)acryloyl group and a vinyl group. Examples of the polyfunctional radically polymerizable compound include (meth)acrylate compounds, vinyl ether group-containing (meth)acrylate compounds, (meth)acryloyl group-containing isocyanurate compounds, (meth)acrylamide compounds, urethane (meth)acrylate compounds, maleimide compounds, vinyl ether compounds, and aromatic vinyl compounds. Among these, (meth)acrylate compounds and urethane (meth)acrylate compounds can be used from the viewpoints of availability and curability.

As the polyfunctional radically polymerizable compound (A) according to the present embodiment, a urethane (meth) acrylate compound having a urethane structure can be used from the viewpoints of easy synthesis, easy availability, and high toughness of a cured product to be obtained.

In addition, a polyfunctional radically polymerizable compound (A) having a polyether structure can be used because the compound has low viscosity, exhibits good liquid drainage during modeling, and provides a high-accuracy cured product. A polyfunctional radically polymerizable compound having a polyester structure or a polycarbonate structure can be used because it provides a cured product having high toughness. Thus, as the polyfunctional radically polymerizable compound (A), a (meth)acrylate compound or a urethane (meth)acrylate compound having any of a polyether structure, a polyester structure, and a polycarbonate structure can be used.

The polyfunctional radically polymerizable compound (A) may be one compound selected from the above compounds, or may contain two or more compounds selected from the above compounds. The term "polyfunctional radically polymerizable compound (A)" used in the present embodiment is a generic name that collectively refers to one or more polyfunctional radically polymerizable compounds contained in a photocurable resin composition.

Examples of the (meth)acrylate compound having a urethane structure include those obtained by a reaction between a hydroxy group-containing (meth)acrylate compound and a polyvalent isocyanate compound. Other examples thereof include those obtained by the reaction of a hydroxy group-containing (meth)acrylate compound, a polyvalent isocyanate compound, and a polyol compound. Among these, from the viewpoint of achieving high toughness, a compound obtained by the reaction of a hydroxy group-containing (meth)acrylate compound, a polyvalent isocyanate compound, and a polyol compound can be particularly used.

Examples of the hydroxy group-containing (meth)acrylate compound include hydroxyalkyl (meth)acrylates, such as 2-hydroxyethyl (meth)acrylate, 2-hydroxypropyl (meth) acrylate, 2-hydroxybutyl (meth)acrylate, 4-hydroxybutyl (meth)acrylate, and 6-hydroxyhexyl (meth)acrylate, 2-hydroxyethylacryloyl phosphate, 2-(meth)acryloyloxyethyl-2-hydroxypropyl phthalate, caprolactone-modified 2-hydroxyethyl (meth)acrylate, dipropylene glycol (meth)acrylate, fatty acid-modified glycidyl (meth)acrylate, polyethylene glycol mono(meth)acrylate, polypropylene glycol mono (meth)acrylate, 2-hydroxy-3-(meth)acryloyloxypropyl (meth)acrylate, glycerol di(meth)acrylate, 2-hydroxy-3-acryloyloxypropyl methacrylate, pentaerythritol tri(meth) acrylate, caprolactone-modified pentaerythritol tri(meth) acrylate, ethylene oxide-modified pentaerythritol tri(meth) acrylate, dipentaerythritol penta(meth)acrylate, caprolactone-modified dipentaerythritol penta(meth)acrylate, and ethylene oxide-modified dipentaerythritol penta (meth)acrylate. These hydroxy group-containing (meth) acrylate compounds may be used alone or in combination of two or more.

Examples of the polyvalent isocyanate compound include aromatic polyisocyanates, such as tolylene diisocyanate, diphenylmethane diisocyanate, polyphenylmethane polyisocyanate, modified diphenylmethane diisocyanate, xylylene diisocyanate, tetramethylxylylene diisocyanate, phenylene diisocyanate, and naphthalene diisocyanate; aliphatic polyisocyanates, such as pentamethylene diisocyanate, hexamethylene diisocyanate, trimethylhexamethylene diisocyanate, lysine diisocyanate, and lysine triisocyanate; alicyclic polyisocyanates, such as hydrogenated diphenylmethane diisocyanate, hydrogenated xylylene diisocyanate, isophorone diisocyanate, norbornene diisocyanate, and 1,3-bis (isocyanatomethyl)cyclohexane; trimer compounds or multimer compounds of these polyisocyanates; allophanate-type polyisocyanates; biuret-type polyisocyanates; and water-dispersible polyisocyanates. These polyvalent isocyanate compounds may be used alone or in combination of two or more.

Examples of the polyol compound include polyether polyols, polyester polyols, polycarbonate polyols, polyolefin polyols, polybutadiene polyols, (meth)acrylic polyols, and polysiloxane polyols. These polyol compounds may be used alone or in combination of two or more.

Examples of the polyether polyol include alkylene structure-containing polyether polyols, such as polyethylene glycol, polypropylene glycol, polytetramethylene glycol, polybutylene glycol, and polyhexamethylene glycol, and random or block copolymers of these polyalkylene glycols.

Examples of the polyester polyol include a condensation polymer of a polyhydric alcohol and a polyvalent carboxylic acid, a ring-opening polymer of a cyclic ester (lactone), and a reaction product of three components of a polyhydric alcohol, a polyvalent carboxylic acid, and a cyclic ester.

Examples of the polyhydric alcohol include ethylene glycol, diethylene glycol, propylene glycol, dipropylene glycol, trimethylene glycol, 1,4-tetramethylene diol, 1,3-tetramethylene diol, 2-methyl-1,3-trimethylene diol, 1,5-pentamethylene diol, neopentyl glycol, 1,6-hexamethylene diol, 3-methyl-1,5-pentamethylene diol, 2,4-diethyl-1,5-pentamethylene diol, glycerol, trimethylolpropane, trimethylolethane, cyclohexane diols, such as 1,4-cyclohexane diol, bisphenols, such as bisphenol A, and sugar alcohols, such as xylitol and sorbitol.

Examples of the polyvalent carboxylic acid include aliphatic dicarboxylic acids, such as malonic acid, maleic acid, fumaric acid, succinic acid, glutaric acid, adipic acid, suberic acid, azelaic acid, sebacic acid, and dodecanedioic acid; alicyclic dicarboxylic acids, such as 1,4-cyclohexanedicarboxylic acid; and aromatic dicarboxylic acids, such as terephthalic acid, isophthalic acid, orthophthalic acid, 2,6-naphthalenedicarboxylic acid, paraphenylene dicarboxylic acid, and trimellitic acid.

Examples of the cyclic ester include propiolactone, β-methyl-δ-valerolactone, and ε-caprolactone.

Examples of the polycarbonate polyol include a reaction product of a polyhydric alcohol and phosgene, and a ring-opening polymer of a cyclic carbonate, such as alkylene carbonate.

Examples of the polyhydric alcohol include the polyhydric alcohols exemplified in the description of the polyester polyol. Examples of the alkylene carbonate include ethylene carbonate, trimethylene carbonate, tetramethylene carbonate, and hexamethylene carbonate.

The polycarbonate polyol may be a compound having a carbonate bond in its molecule and a hydroxy group at a terminal, and may have an ester bond together with the carbonate bond.

Examples of the polyfunctional radically polymerizable compound (A) having any one of a polyether structure, a polyester structure, and a polycarbonate structure include compounds each obtained by reacting any one of the polyether polyol, the polyester polyol, and the polycarbonate polyol with a (meth)acryloyl chloride or a (meth)acrylic acid compound.

In the present embodiment, the polyfunctional radically polymerizable compound (A) contained in the photocurable resin composition has an ethylenically unsaturated group equivalent of 700 g/eq or more and 7,000 g/eq or less. When the polyfunctional radically polymerizable compound (A) contained in the photocurable resin composition is a single compound, a polyfunctional radically polymerizable compound having an ethylenically unsaturated group equivalent of 700 g/eq or more and 7,000 g/eq or less is used. The ethylenically unsaturated group equivalent used here is a value obtained by dividing the weight-average molecular weight (Mw) of the polyfunctional radically polymerizable compound by the number of ethylenically unsaturated groups in one molecule. A larger ethylenically unsaturated group equivalent results in a smaller crosslink density of a cured product obtained by curing the photocurable resin composition, thus improving the toughness of the resulting cured product. When the photocurable resin composition contains multiple polyfunctional radically polymerizable compounds, the ethylenically unsaturated group equivalent of the polyfunctional radically polymerizable compound (A) can be calculated by weighted-averaging individual ethylenically unsaturated group equivalents of the multiple polyfunctional radically polymerizable compounds with respective ratios by mass of the multiple polyfunctional radically polymerizable compounds contained in the photocurable resin composition. The multiple polyfunctional radically polymerizable compounds are mixed and used in a ratio such that the value is 700 g/eq or more and 7,000 g/eq or less. When the photocurable resin composition contains multiple polyfunctional radically polymerizable compounds, the polyfunctional radically polymerizable compounds can be a mixture of a polyfunctional radically polymerizable compound having an ethylenically unsaturated group equivalent of 700 g/eq or more and 7,000 g/eq or less and a polyfunctional radically polymerizable compound having an ethylenically unsaturated group equivalent of less than 700 g/eq.

A larger ethylenically unsaturated group equivalent of the polyfunctional radically polymerizable compound (A) results in a cured product having excellent toughness; however, the crosslink density decreases, leading to decreases in heat resistance and elastic modulus. An ethylenically unsaturated group equivalent of 7,000 g/eq or less results in an appropriate range of crosslink density and a cured product having good heat resistance and elastic modulus. The cured product according to the present embodiment may be subjected to heat treatment after curing the photocurable resin composition. An ethylenically unsaturated group equivalent of 7,000 g/eq or less is unlikely to cause deformation during the heat treatment. In addition, even if a force is applied to the cured product, deformation can be unlikely to occur, thus providing high shape stability.

When the polyfunctional radically polymerizable compound (A) has an ethylenically unsaturated group equivalent of 700 g/eq or more, the crosslink density of a cured product after photocuring can be controlled within an appropriate range. This results in good toughness, and the cured product is less likely to crack when the cured product is fitted or screwed to another component, or when machined to provide a threaded hole, for example.

Accordingly, the polyfunctional radically polymerizable compound (A) has an ethylenically unsaturated group equivalent of 700 g/eq or more and 7,000 g/eq or less, preferably 700 g/eq or more and 4,000 g/eq or less, from the viewpoints of achieving excellent toughness and shape stability of a cured product to be obtained.

The weight-average molecular weight (Mw) of the polyfunctional radically polymerizable compound (A) according to the present embodiment is a weight-average molecular weight in terms of standard polystyrene molecular weight. The weight-average molecular weight can be measured using high-performance liquid chromatography. For example, the measurement can be performed by connecting two columns: Shodex GPCLF 804 (exclusion limit molecular weight: $2\times10^6$, separation range: 300 to $2\times10^6$) in series to a high-speed GPC apparatus "HLC-8220GPC" available from Tosoh Corporation.

The amount of polyfunctional radically polymerizable compound (A) contained in the photocurable resin composition according to the present embodiment is 20 parts or more by mass and 75 parts or less by mass based on a total of 100 parts by mass of the polyfunctional radically polymerizable compound (A) and the monofunctional radically polymerizable compound (B) described below. A polyfunctional radically polymerizable compound (A) content of 20 parts or more by mass can result in curability of the photocurable resin composition and a cured product having good toughness. A polyfunctional radically polymerizable compound (A) content of 75 parts or less by mass can result in a photocurable resin composition having a viscosity that can be used for stereolithography. The amount of polyfunctional radically polymerizable compound (A) is preferably 30 parts or more by mass and 75 parts or less by mass, more preferably 40 parts or more by mass and 65 parts or less by mass, based on a total of 100 parts by mass of the total of the polyfunctional radically polymerizable compound (A) and the monofunctional radically polymerizable compound (B) described below.

Monofunctional Radically Polymerizable Compound (B)

The monofunctional radically polymerizable compound (B) is a compound having one radically polymerizable functional group in its molecule. When the photocurable resin composition according to the present embodiment contains the monofunctional radically polymerizable compound (B), the viscosity of the photocurable resin composition can be adjusted to a range that can be used for three-dimensional modeling. Adjustment of the amount of monofunctional radically polymerizable compound (B) added and appropriate selection of the type thereof make it possible to adjust the mechanical properties of the cured product obtained by curing the photocurable resin composition to a desired range, as well.

Examples of the monofunctional radically polymerizable compound (B) include, but are not limited to, acrylamide compounds, (meth)acrylate compounds, maleimide compounds, styrene compounds, acrylonitrile compounds, vinyl ester compounds, N-vinyl compounds, conjugated diene compounds, vinyl ketone compounds, halogenated vinyl compounds, and halogenated vinylidene compounds.

Among these, acrylamide compounds, (meth)acrylate compounds, maleimide compounds, and N-vinyl compounds can be particularly used from the viewpoints of achieving excellent curability of the photocurable resin composition and excellent mechanical properties of a cured product to be obtained.

Examples of acrylamide compounds include (meth)acrylamide, N-methyl(meth)acrylamide, N-isopropyl(meth)acrylamide, N-tert-butyl(meth)acrylamide, N-phenyl(meth)acrylamide, N-methylol(meth)acrylamide, N,N-diacetone (meth)acrylamide, N,N-dimethyl(meth)acrylamide, N,N-diethyl(meth)acrylamide, N,N-dipropyl(meth)acrylamide, N,N-dibutyl(meth)acrylamide, N-(meth)acryloylmorpholine, N-(meth)acryloylpiperidine, N-[3-(dimethylamino)propyl]acrylamide, and N-tert-octyl(meth)acrylamide.

Examples of the (meth)acrylate compounds include methyl (meth)acrylate, ethyl (meth)acrylate, n-butyl (meth)acrylate, isobutyl (meth)acrylate, tert-butyl (meth)acrylate, 2-ethylhexyl (meth)acrylate, n-octyl (meth)acrylate, i-octyl (meth)acrylate, lauryl (meth)acrylate, stearyl (meth)acrylate, cyclohexyl (meth)acrylate, isobornyl (meth)acrylate, adamantyl (meth)acrylate, 3-hydroxy-1-adamantyl (meth)acrylate, 3,5-dihydroxy-1-adamantyl (meth)acrylate, 2-methyl-2-adamantyl (meth)acrylate, 2-ethyl-2-adamantyl (meth)acrylate, 2-isopropyl-2-adamantyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, glycidyl (meth)acrylate, 3-methyl-3-oxetanylmethyl (meth)acrylate, tetrahydrofurfuryl (meth)acrylates, phenylglycidyl (meth)acrylate, dimethylaminomethyl (meth)acrylate, phenylcellosolve (meth)acrylate, dicyclopentenyl (meth)acrylate, dicyclopentenyloxyethyl (meth)acrylate, biphenyl (meth)acrylate, 2-hydroxyethyl(meth)acryloyl phosphate, phenyl (meth)acrylate, phenoxyethyl (meth)acrylate, phenoxypropyl (meth)acrylate, benzyl (meth)acrylate, butoxy triethylene glycol (meth)acrylate, 2-ethylhexyl polyethylene glycol (meth)acrylate, nonylphenyl polypropylene glycol (meth)acrylate, methoxy dipropylene glycol (meth)acrylate, glycerol (meth)acrylate, trifluoromethyl (meth)acrylate, trifluoroethyl (meth)acrylate, tetrafluoropropyl (meth)acrylate, octafluoropentyl (meth)acrylate, polyethylene glycol (meth)acrylate, polypropylene glycol (meth)acrylate, allyl (meth)acrylate, 2,2,2-trifluoroethyl (meth)acrylate, 2,2,3,3-tetrafluoropropyl (meth)acrylate, 1H,1H,5H-octafluoropentyl (meth)acrylate, epichlorohydrin-modified butyl (meth)acrylate, epichlorohydrin-modified phenoxy (meth)acrylate, ethyleneoxide (EO)-modified phthalate (meth)acrylate, EO-modified succinate (meth)acrylate, caprolactone-modified 2-hydroxyethyl (meth)acrylate, N,N-dimethylaminoethyl (meth)acrylate, N,N-diethylaminoethyl (meth)acrylate, morpholino (meth)acrylate, EO-modified phosphate (meth)acrylate, methyl allyloxyacrylate (product name: AO-MA, available from Nippon Shokubai Co., Ltd.), imide group-containing (meth)acrylates (product name: M-140, available from Toagosei Co., Ltd.), and monofunctional (meth)acrylates having a siloxane structure.

Examples of the maleimide compounds include maleimide, N-methylmaleimide, N-ethylmaleimide, N-propylmaleimide, N-butylmaleimide, N-hexylmaleimide, N-octylmaleimide, N-dodecylmaleimide, N-stearylmaleimide, N-phenylmaleimide, and N-cyclohexylmaleimide.

Examples of the N-vinyl compounds include N-vinylpyrrolidone, N-vinylcaprolactam, N-vinylimidazole, N-vinylmorpholine, and N-vinylacetamide.

Examples of other monofunctional radically polymerizable compounds include styrene derivatives, such as styrene, vinyltoluene, α-methylstyrene, chlorostyrene, styrenesulfonic acid and salts thereof; vinyl esters, such as vinyl acetate, vinyl propionate, vinyl pivalate, vinyl benzoate, and vinyl cinnamate; and vinyl cyanide compounds, such as (meth)acrylonitrile.

These monofunctional radically polymerizable compounds may be used alone or in combination of two or more.

The amount of monofunctional radically polymerizable compound (B) contained in the photocurable resin composition according to the present embodiment is 25 parts or more by mass and 80 parts or less by mass, preferably 25 parts or more by mass and 70 parts or less by mass, more preferably 35 parts or more by mass and 60 parts or less by mass, based on a total of 100 parts by mass of the polyfunctional radically polymerizable compound (A) and the monofunctional radically polymerizable compound (B). A monofunctional radically polymerizable compound (B) content of 25 parts or more by mass can result in a viscosity that can be used for three-dimensional modeling. At a monofunctional radically polymerizable compound (B) content of 80 parts or less by mass, a cured product obtained by curing the photocurable resin composition can have toughness in a range in which the cured product can be used as an actual product.

Fluororesin Particles (C)

As the fluororesin particles (C), particles having a fluororesin in whole or in part and maintaining the shape of the particles in the photocurable resin composition are used. The fluororesin particles (C) can be particularly substantially insoluble in the mixture of the polyfunctional radically polymerizable compound (A) and the monofunctional radically polymerizable compound (B). When the fluororesin particles (C) are not dissolved, the fluororesin particles (C) having good sliding properties can be contained in the cured product as a solid lubricant, and thus the cured product exhibits high wear resistance and a low coefficient of friction. Here, the phrase “substantially insoluble” indicates that the average particle size of the fluororesin particles (C) does not decrease over time after the fluororesin particles (C) are mixed with the polyfunctional radically polymerizable compound (A) and the monofunctional radically polymerizable compound (B).

The fluororesin particles (C) may contain a fluororesin in part of the particles. From the viewpoint of improving the sliding properties, the fluororesin contained in the particles can be present on the surfaces of the particles. Specific examples thereof include particles each entirely composed of a fluororesin and core-shell particles each having a shell composed of a fluororesin.

The fluororesin particles (C) containing a material other than the fluororesin preferably have a fluororesin content of 50% or more by mass, particularly preferably 80% or more by mass, based on the total mass of the particles, because exposure of fluoropolymer on the surface of the particles presumably results in the cured product exhibiting high wear resistance and a low coefficient of friction.

The fluororesin particles (C) according to the present embodiment are produced by polymerizing a fluorine-containing olefin, and may be a homopolymer of a single olefin or a copolymer of multiple olefins. Examples of the copolymer include a copolymer of a fluorine-free olefin and a fluorine-containing olefin; and a copolymer of multiple fluorine-containing olefins. A larger number of fluorine atoms in the copolymer results in better sliding properties. Thus, the copolymer of multiple fluorine-containing olefins can be used. Examples of the homopolymer include a partially fluorinated resin in which hydrogen atoms in the olefin remain partially; and a fully fluorinated resin in which hydrogen atoms are completely replaced with fluorine atoms. A larger number of fluorine atoms in the homopolymer results in better sliding properties. Thus, the fully fluorinated resin can be used.

Examples of the fluororesin particles (C) of the present embodiment include tetrafluoroethylene polymers, trifluorochloroethylene polymers, vinylidene fluoride polymers, vinyl fluoride polymers, trifluorochloroethylene-ethylene copolymers, tetrafluoroethylene-hexafluoropropylene copolymers, tetrafluoroethylene-perfluoroalkyl vinyl ether copolymers, tetrafluoroethylene-perfluorodioxole copolymers, tetrafluoroethylene-perfluoromethyl vinyl ether copolymers, vinylidene fluoride-hexafluoropropylene copolymers, tetrafluoroethylene-perfluoro[2-(fluorosulfonylethoxy)propyl vinyl ether] copolymers, tetrafluoroethylene-ethylene copolymers, and tetrafluoroethylene-propylene copolymers. A larger number of fluorine atoms contained in the molecule results in better sliding properties. Thus, tetrafluoroethylene polymers and tetrafluoroethylene-hexafluoropropylene copolymers can be used. In the present embodiment, particles of a single type of fluororesin may be used, or particles of two or more types of fluororesins may be used in combination.

The fluororesin particles (C) contained in the photocurable resin composition according to the present embodiment have an average particle size of 50 μm or less. In stereolithography, layers are often stacked in a thickness unit of 200 μm or less. Thus, an average particle size of 50 μm or less is less likely to cause the fluororesin particles (C) to be unevenly distributed in a layer. When the average particle size of the fluororesin particles (C) is 0.5 μm or more, a significant increase in the viscosity of the photocurable resin composition is less likely to occur. Accordingly, the fluororesin particles (C) preferably have an average particle size of 0.5 μm or more and 50 μm or less, more preferably 0.5 μm or more and 20 μm or less, because of easy availability.

Here, the average particle size of the fluororesin particles (C) refers to a value at which the cumulative volume frequency of the equivalent spherical diameter by a light scattering method (laser diffraction/scattering method) is 50%. A specific measurement principle of the light scattering method is described below.

In the light scattering method (laser diffraction/scattering method), the distribution of the equivalent spherical diameter can be measured by measuring the angular dependence of the intensity of light scattered when laser light passes through a particle sample dispersed in a solution or a gas. For example, a larger particle scatters light at a smaller angle with respect to the laser light, and a smaller particle scatters light at a larger angle.

The data for each angle of scattered light is measured, and from the obtained scattering pattern, the volume frequency distribution of the equivalent spherical diameter can be obtained using the Mie theory of light scattering.

A specific measurement method is, for example, as follows: First, 1 mg of fluororesin particles is added to 20 mL of isopropanol. Thereafter, dispersion treatment is performed for about 3 minutes by an ultrasonic disperser to prepare a sample. As a particle size distribution measurement apparatus for the light scattering method (laser diffraction/scattering method), for example, Partica LA 950 available from Horiba, Ltd. can be used. The volume frequency of the equivalent spherical diameter of the fluororesin particles is measured with the measurement apparatus using the light scattering method (laser diffraction/scattering method), and a value at which the cumulative volume frequency is 50% (generally referred to as median diameter or D50) is obtained.

The photocurable resin composition may contain the fluororesin particles (C) of a single type or may contain the particles (C) containing multiple types of fluororesins that differ from each other in average particle size and material.

The photocurable resin composition according to the present embodiment contains the fluororesin particles (C) in an amount of 5 parts or more by mass and 30 parts or less by mass, preferably 10 parts or more by mass and 20 parts or less by mass, based on a total of 100 parts by mass of the polyfunctional radically polymerizable compound (A) and the monofunctional radically polymerizable compound (B).

When the amount of fluororesin particles (C) contained is within this range, a viscosity that can be used for stereolithography is obtained, and the coefficient of friction and wear resistance of a cured product obtained by curing the photocurable resin composition are also satisfactory.

Curing Agent (D)

As the curing agent (D), a photoradical polymerization initiator can be used, and a thermal radical polymerization initiator may be contained in addition to the photoradical polymerization initiator. When the photocurable resin composition contains the thermal radical polymerization initiator, a polymerization reaction can be advanced by performing heat treatment after curing by light irradiation, and the mechanical properties of a cured product can be further improved.

Photoradical Polymerization Initiator

Photoradical polymerization initiators are mainly classified into an intramolecular cleavage type and a hydrogen abstraction type. In the intramolecular cleavage type, the bond at a specific site is broken by absorption of light of a specific wavelength, and a radical is generated at the broken site, which serves as a polymerization initiator to start the polymerization of the polyfunctional radically polymerizable compound (A) and the monofunctional radically polymerizable compound (B). In the hydrogen abstraction type, the initiator absorbs light of a specific wavelength and goes into an excited state, where the excited species undergoes a hydrogen abstraction reaction from surrounding hydrogen donors to generate radicals. The generated radicals then serve as polymerization initiators to initiate the polymerization of the polyfunctional radically polymerizable compound (A) and the monofunctional radically polymerizable compound (B). In this embodiment, two or more of photoradical polymerization initiators may be used in combination, or may be used alone.

As the intramolecular cleavage-type photoradical polymerization initiator, alkylphenone photoradical polymerization initiators, acylphosphine oxide photoradical polymerization initiators, and oxime ester photoradical polymerization initiators are known. These are of the type in which bonds adjacent to the carbonyl group undergo α-cleavage to form a radical species.

Examples of the alkylphenone photoradical polymerization initiators include benzyl methyl ketal photoradical polymerization initiators, α-hydroxyalkylphenone photoradical polymerization initiators, and aminoalkylphenone photoradical polymerization initiators. Specific examples of the benzyl methyl ketal photoradical polymerization initiators include, but are not limited to, 2,2'-dimethoxy-1,2-diphenylethan-1-one (Irgacure® 651, available from BASF). Examples of the α-hydroxyalkylphenone photoradical polymerization initiators include, but are not limited to, 2-hydroxy-2-methyl-1-phenylpropan-1-one (Darocur® 1173, available from BASF), 1-hydroxycyclohexyl phenyl ketone (Irgacure® 184, available from BASF), 1-[4-(2-hydroxyethoxy)phenyl]-2-hydroxy-2-methyl-1-propan-1-one (Irgacure® 2959, available from BASF), and 2-hydroxy-1-{4-[4-(2-hydroxy-2-methylpropionyl)benzyl]phenyl}-2-methylpropan-1-one (Irgacure® 127, available from BASF). Examples of the aminoalkylphenone photoradical polymerization initiators include, but are not limited to, 2-methyl-1-(4-methylthiophenyl)-2-morpholinopropan-1-one (Irgacure® 907, available from BASF) and 2-benzyl-methyl-2-dimethylamino-1-(4-morpholinophenyl)-1-butanone (Irgacure® 369, available from BASF).

Examples of the acylphosphine oxide photoradical polymerization initiators include, but are not limited to, 2,4,6-trimethylbenzoyldiphenylphosphine oxide (Lucirin® TPO, available from BASF) and bis(2,4,6-trimethylbenzoyl) phenylphosphine oxide (Omnirad® 819, available from IGM Resins).

An example of the oxime ester photoradical polymerization initiators is, but not limited to, (2E)-2-(benzoyloxyimino)-1-[4-(phenylthio)phenyl]octan-1-one (Irgacure® OXE-01, available from BASF).

Examples of the hydrogen abstraction-type photoradical polymerization initiator include, but are not limited to, anthraquinone derivatives, such as 2-ethyl-9,10-anthraquinone and 2-tert-butyl-9,10-anthraquinone, and thioxanthone derivatives, such as isopropylthioxanthone and 2,4-diethylthioxanthone.

The amount of photoradical polymerization initiator added in the photocurable resin composition is preferably 0.1 parts or more by mass and 15 parts or less by mass based on a total of 100 parts by mass of the polyfunctional radically polymerizable compound (A) and the monofunctional radically polymerizable compound (B). The addition within this range enables sufficient polymerization to occur uniformly, thereby resulting in a cured product with high optical transparency. The amount thereof is more preferably 0.1 parts or more by mass and 10 parts or less by mass.

Thermal Radical Polymerization Initiator

As the thermal radical polymerization initiator, any conventionally known compound that generates a radical by heating can be used. Examples thereof include azo compounds, peroxides, and persulfates.

Examples of the azo compounds include 2,2'-azobisisobutyronitrile, 2,2'-azobis(methyl isobutyrate), 2,2'-azobis-2,4-dimethylvaleronitrile, and 1,1'-azobis(1-acetoxy-1-phenylethane).

Examples of the peroxides include benzoyl peroxide, di-tert-butylbenzoyl peroxide, tert-butyl peroxypivalate, and di(4-tert-butylcyclohexyl) peroxydicarbonate.

Examples of the persulfates include persulfates, such as ammonium persulfate, sodium persulfate, and potassium persulfate.

The amount of thermal radical polymerization initiator added is preferably 0.1 parts or more by mass and 15 parts or less by mass, more preferably 0.1 parts or more by mass and 10 parts or less by mass, based on a total of 100 parts by mass of the polyfunctional radically polymerizable compound (A) and the monofunctional radically polymerizable compound (B). The use of the thermal radical polymerization initiator within this range makes it possible to obtain a cured product having an appropriate molecular weight and good physical properties.

Other Components

The photocurable resin composition of the present embodiment may contain various additives as other optional components as long as the object and effect of the present embodiment are not impaired. Examples of the additives include resins, such as epoxy resins, polyurethane, polybutadiene, polychloroprene, polyester, styrene-butadiene block copolymers, polysiloxane, petroleum resins, xylene resins, ketone resins, and cellulose resins, engineering plastics, such as polycarbonate, modified polyphenylene ether, polyamide, polyacetal, polyethylene terephthalate, polybutylene terephthalate, polyphenylsulfone, polysulfone, polyarylate, polyetherimide, polyether ether ketone, polyphenylene sulfide, polyether sulfone, polyamide-imide, liquid crystal polymers, polytetrafluoroethylene, polychlorotrifluoroethylene, and polyvinylidene fluoride, reactive monomers, such as fluorine-containing oligomers, silicon-containing oligomers, polysulfide oligomers, fluorine-containing monomers, and siloxane structure-containing monomers, soft metals, such as gold, silver, and lead, layered crystal structure substances, such as graphite, molybdenum disulfide, tungsten disulfide, boron nitride, graphite fluoride, calcium fluoride, barium fluoride, lithium fluoride, silicon nitride, and molybdenum selenide, polymerization inhibitors, such as phenothiazines and 2,6-di-tert-butyl-4-methylphenol, photosensitizers, such as benzoin compounds, acetophenone compounds, anthraquinone compounds, thioxanthone compounds, ketal compounds, benzophenone compounds, tertiary amine compounds, and xanthone compounds, polymerization initiation aids, leveling agents, wettability improvers, surfactants, plasticizers, ultraviolet absorbers, silane coupling agents, inorganic fillers, pigments, dyes, antioxidants, flame retardants, thickeners, and antifoaming agents.

Preparation of Photocurable Resin Composition

The photocurable resin composition of the present embodiment is prepared by adding appropriate amounts of other optional components as necessary to the essential components, i.e., the polyfunctional radically polymerizable compound (A), the monofunctional radically polymerizable compound (B), the fluororesin particles (C), and the curing agent (D). Specifically, the composition can be prepared by charging these components into a stirring container and stirring the mixture at usually 30° C. or higher and 120° C. or lower, preferably 50° C. or higher and 100° C. or lower. The stirring time is usually 1 minute or more and 6 hours or less, preferably 10 minutes or more and 2 hours or less. The total amount of the polyfunctional radically polymerizable compound (A), the monofunctional radically polymerizable compound (B), and the fluororesin particles (C) contained is preferably 25 parts or more by mass and 100 parts or less by mass based on 100 parts by mass of the photocurable resin composition excluding the curing agent (D).

More preferably, the total amount is 75 parts or more by mass and 100 parts or less by mass. That is, in 100 parts by mass of the photocurable resin composition excluding the curing agent (D), components other than the above-described essential components may be contained in a range of 75 parts or less by mass, preferably 25 parts or less by mass.

The viscosity at 25° C. of the photocurable resin composition of the present embodiment is preferably 50 mPa·s or more and 30,000 mPa·s or less, more preferably 50 mPa·s or more and 10,000 mPa·s or less.

The photocurable resin composition according to the present embodiment can be used as a modeling material for stereolithography. That is, an article having a desired shape can be manufactured by irradiating the photocurable resin composition according to the present embodiment with a light energy beam in accordance with slice data generated from three-dimensional shape data of an article to be shaped (shaping model) and supplying energy necessary for curing.

Cured Product

A cured product according to the present embodiment can be obtained by curing the above-described photocurable resin composition using irradiation with a light energy beam. Examples of the light energy beam include ultraviolet radiation and infrared radiation. Among these, a light beam having a wavelength of 300 nm or more and 450 nm or less can be used because the light beam easily available due to its general-purpose versatility and its energy is easily absorbed by the photoradical polymerization initiator. As a light source of the light energy beam, an ultraviolet or infrared laser, such as an Ar laser or a He—Cd laser, a mercury lamp, a xenon lamp, a halogen lamp, or a fluorescent lamp, can be used. Among these, a laser light source can be used because the shaping time can be shortened by increasing the energy level, and high shaping accuracy can be obtained by reducing the irradiation diameter due to excellent light-condensing properties. The light energy beam can be appropriately selected in accordance with the type of the radical polymerization initiator contained in the photocurable resin composition, and multiple light energy beams can be used in combination.

Function of Photocurable Resin Composition

In the photocurable resin composition according to the present embodiment, the ethylenically unsaturated group equivalent of the polyfunctional radically polymerizable compound (A) is 700 g/eq or more and 7,000 g/eq or less; thus, a cured product after curing has good toughness and shape stability. In the present embodiment, a case where the Charpy impact strength measured in accordance with JIS K 7111 is 1.0 kJ/$m^2$ or more is defined as good toughness, and a case where the Charpy impact strength is 3.0 kJ/$m^2$ or more is defined as excellent toughness. When the toughness of the test specimen is 1.0 kJ/$m^2$ or more, the cured product is less likely to be damaged when the cured product is fitted into another member or subjected to secondary processing.

The cured product obtained by curing the photocurable resin composition according to the present embodiment has a low coefficient of friction and high wear resistance because it contains the fluororesin particles (C). The specific wear rate of the cured product is preferably less than 1.0 $mm^3 \cdot N^{-1} \cdot Km^{-1}$, more preferably less than 0.5 $mm^3 \cdot N^{-1} \cdot Km^{-1}$. In addition, the coefficient of friction of the cured product is preferably less than 1.0, more preferably less than 0.5.

Method for Manufacturing Three-Dimensional Object

Since the photocurable resin composition according to the present embodiment contains a photopolymerization initiator, such as a photoradical polymerization initiator, as the curing agent (D), the photocurable resin composition can be used as a modeling material for use in stereolithography. In other words, the cured product composed of the photocurable resin composition according to the present embodiment can be manufactured as a three-dimensional object by known stereolithography. A method for manufacturing a three-dimensional object using stereolithography includes the steps of disposing the photocurable resin composition in a layer having a predetermined thickness, and irradiating the photocurable resin composition with light energy based on slice data of a shaping model to cure the photocurable resin composition. The method for manufacturing a three-dimensional object using stereolithography can further include a step of subjecting a cured product obtained by light energy irradiation to heat treatment. The light energy used for irradiation can be a laser beam or light emitted from a projector. Typical examples of stereolithography are roughly classified into two types: a free surface method and a constrained surface method.

FIGURE illustrates a configuration example of a stereolithography apparatus 100 using the free surface method. The stereolithography apparatus 100 includes a tank 11 filled with a liquid photocurable resin composition 10. A build platform 12 is disposed in the tank 11 so as to be driven in the vertical direction by a drive shaft 13. The irradiation position of a light energy beam 15 emitted from the light source 14 can be changed with a galvanometer mirror 16 controlled by a controller 18 in accordance with slice data, and the light energy beam 15 can be scanned on a surface of the photocurable resin composition 10 in the tank 11. In FIGURE, the scanning range of the light energy beam 15 is indicated by thick broken lines.

The thickness d of the photocurable resin composition 10 cured by the light energy beam 15 is a value determined on the basis of the setting at the time of generation of the slice data, and affects the accuracy of a three-dimensional object 17 to be obtained (reproducibility of the three-dimensional shape data of the article to be shaped). The thickness d is controlled by controlling the amount of movement of the drive shaft 13 using the controller 18.

The controller 18 controls the drive shaft 13 on the basis of the setting to supply the photocurable resin composition having a thickness d onto the build platform 12. The liquid photocurable resin composition on the build platform 12 is selectively irradiated with the light energy beam on the basis of the slice data to form a cured layer having a desired pattern. The uncured photocurable resin composition having a thickness d is supplied onto a surface of the cured layer by moving the build platform 12 in the direction of a hollow arrow. Irradiation with the light energy beam 15 is performed on the basis of the slice data to form a cured product integrated with the previously formed cured layer. The three-dimensional object 17 can be obtained by repeating the step of stacking the cured layer having the predetermined thickness d.

The three-dimensional object 17 thus obtained is taken out from the tank 11. The unreacted photocurable resin composition remaining on the surface is removed. Then cleaning and post-processing are performed as necessary. As a cleaning agent used for cleaning, an alcoholic organic solvent represented by alcohols, such as isopropyl alcohol and ethyl alcohol, can be used. A ketone organic solvent represented by acetone, ethyl acetate, methyl ethyl ketone, or the like, or an aliphatic organic solvent represented by terpenes may also be used. After cleaning with the cleaning agent, post-processing is performed as necessary. For example, post-curing by light irradiation and/or heat irradiation may be performed. The post-curing can cure the unreacted photocurable resin composition remaining on the surface and inside of the cured product, thereby reducing the stickiness of the surface of the three-dimensional object and improving the initial strength of the three-dimensional object. As the post-processing, shape processing, such as removal of a support body, polishing of the surface, or formation of a screw hole, may be performed.

Examples of the light energy beam used in the production include ultraviolet radiation, electron beams, X-rays, and radiation. Among these, ultraviolet radiation having a wavelength of 300 nm or more and 450 nm or less can be used because it is highly versatile and available at a relatively low cost. As the light source for generating ultraviolet radiation, an ultraviolet laser, such as an Ar laser or a He—Cd laser, a mercury lamp, a xenon lamp, a halogen lamp, a fluorescent lamp, or the like can be used. Among these, a laser light source can be used because it is excellent in light-condensing properties, can shorten the shaping time by increasing the energy level, and can obtain high modeling accuracy.

In irradiating the photocurable resin composition disposed to have a predetermined thickness with a light energy beam, as described above, the resin can be cured by a point drawing method or a line drawing method using the light energy beam focused in a point shape or a line shape. Alternatively, the resin may be cured by planar irradiation of a light energy beam through a planar drawing mask formed by an array of multiple minute light shutters such as liquid crystal shutters or digital micromirror shutters.

As with the free surface method, shaping with the constrained surface method can also be used. A stereolithography apparatus using the constrained surface method includes a build platform corresponding to the build platform 12 of the stereolithography apparatus 100 illustrated in FIGURE and being configured to be able to pull up the three-dimensional object above the liquid surface, and also includes a light irradiation unit below the tank 11. A representative shaping example of the constrained surface method is as follows: First, the supporting surface of the build platform configured to be freely elevated and lowered is placed so as to have a predetermined distance from the bottom surface of the tank containing the photocurable resin composition, and the photocurable resin composition is supplied between the supporting surface of the build platform and the bottom surface of the tank so as to have a predetermined thickness d. Next, a region of the photocurable resin composition corresponding to the slice data and located between the supporting surface of the platform and the bottom surface of the tank is selectively irradiated with light emitted from a laser light source or a projector from the bottom surface side of the tank containing the photocurable resin composition. The light irradiation cures the photocurable resin composition between the supporting surface of the platform and the bottom surface of the tank to form a cured layer of the photocurable resin composition. The build platform is then raised to pull the cured layer off the bottom surface of the tank.

The height of the build platform is adjusted so that the distance between the cured layer formed on the build platform and the bottom surface of the tank is a predetermined distance d, and the photocurable resin composition is supplied to a predetermined thickness d between the support surface of the build platform and the bottom surface of the tank. Selective irradiation with light in the same manner as described above forms a new cured layer bonded to the previously formed cured layer, between the cured layer and the bottom surface of the tank. By repeating this step a predetermined number of times while changing or not changing the pattern to be irradiated with light in accordance with the slice data, a three-dimensional object in which multiple cured layers are integrally laminated is formed.

Applications

The photocurable resin composition according to the present embodiment and a three-dimensional object that is a cured product thereof can be used for any application. For example, the photocurable resin composition can be used as a modeling material for stereolithographic 3D printers, and the cured product can be used for various products, such as sporting goods, medical and nursing care products, custom-made products such as artificial limbs, dentures, and artificial bones, industrial machinery and equipment, precision instruments, electrical and electronic apparatuses, electrical and electronic components, and building materials.

Included Configurations

The disclosure of the present embodiment includes the following configurations.

(Configuration 1) A photocurable resin composition for three-dimensional modeling includes a polyfunctional radically polymerizable compound (A), a monofunctional radically polymerizable compound (B), and a curing agent (D), in which the polyfunctional radically polymerizable compound (A) has an ethylenically unsaturated group equivalent of 700 g/eq or more and 7,000 g/eq or less, the polyfunctional radically polymerizable compound (A) is contained in an amount of 20 parts or more by mass and 75 parts or less by mass based on a total of 100 parts by mass of the polyfunctional radically polymerizable compound (A) and the monofunctional radically polymerizable compound (B), fluororesin particles (C) are contained in an amount of 5 parts or more by mass and 30 parts or less by mass based on a total of 100 parts by mass of the polyfunctional radically polymerizable compound (A) and the monofunctional radically polymerizable compound (B), and the fluororesin particles (C) have an average particle size of 50 μm or less.

(Configuration 2) In the photocurable resin composition described in Configuration 1, the polyfunctional radically polymerizable compound (A) is a single polyfunctional radically polymerizable compound.

(Configuration 3) In the photocurable resin composition described in Configuration 1 or 2, the polyfunctional radically polymerizable compound (A) is a mixture containing multiple polyfunctional radically polymerizable compounds and has an ethylenically unsaturated group equivalent of 700 g/eq or more and 7,000 g/eq or less, the ethylenically unsaturated group equivalent being determined by weighted-averaging individual ethylenically unsaturated group equivalents of the multiple polyfunctional radically polymerizable compounds with respective ratios by mass of the multiple polyfunctional radically polymerizable compounds.

(Configuration 4) In the photocurable resin composition described in Configuration 3, the polyfunctional radically polymerizable compound (A) is a mixture of a polyfunctional radically polymerizable compound having an ethylenically unsaturated group equivalent of 700 g/eq or more and 7,000 g/eq or less and a polyfunctional radically polymerizable compound having an ethylenically unsaturated group equivalent of less than 700 g/eq.

(Configuration 5) In the photocurable resin composition described in any one of Configurations 1 to 4, the polyfunctional radically polymerizable compound (A) is a (meth) acrylate compound or a urethane (meth)acrylate compound having any of a polyether structure, a polyester structure, and a polycarbonate structure.

(Configuration 6) In the photocurable resin composition described in any one of Configurations 1 to 5, the fluororesin particles (C) have an average particle size of 0.5 μm or more.

(Configuration 7) In the photocurable resin composition described in Configuration 6, the fluororesin particles (C) have an average particle size of 0.5 μm or more and 20 μm or less.

(Configuration 8) In the photocurable resin composition described in any one of Configurations 1 to 7, the monofunctional radically polymerizable compound (B) is selected from acrylamide compounds, (meth)acrylate compounds, maleimide compounds, and N-vinyl compounds.

(Configuration 9) In the photocurable resin composition described in any one of Configurations 1 to 8, the curing agent (D) is at least a photoradical polymerization initiator.

(Configuration 10) A cured product is obtained by curing the photocurable resin composition described in any one of Configurations 1 to 9.

(Configuration 11) In the cured product described in Configuration 10, the cured product has a specific wear rate of less than 1.0 $mm^3 \cdot N^{-1} \cdot Km^{-1}$.

(Configuration 12) In the cured product described in Configuration 10 or 11, the cured product has a coefficient of friction of less than 1.0.

(Configuration 13) A method for manufacturing a three-dimensional object using stereolithography includes the steps of:

disposing a photocurable resin composition in a layer; and irradiating the layered photocurable resin composition with light energy based on slice data of a shaping model to cure the layered photocurable resin composition, in which the photocurable resin composition is the photocurable resin composition described in any one of Configurations 1 to 9.

(Configuration 14) The method for manufacturing a three-dimensional object described in Configuration 13 further includes a step of performing heat treatment after the step of irradiating the photocurable resin composition with the light energy.

(Configuration 15) In the method for manufacturing a three-dimensional object described in Configuration 13 or 14, the light energy is light emitted from a laser light source or a projector.

EXAMPLES

Examples will be given below to describe the present embodiment in detail, but the present embodiment is not limited to these examples.

Components

The components used in Examples and Comparative examples are described below. Polyfunctional Radically Polymerizable Compound (A)

Table 1 presents polyfunctional radically polymerizable compounds (A) used in Examples and Comparative examples. A-3 is a mixture of 70 parts by mass of urethane acrylate and 30 parts by mass of B-3 described below, but only urethane acrylate is described in Table 1.

TABLE 1

| | Compound | Functional group | Number of functional groups in one molecule | Weight-average molecular weight | Ethylenically unsaturated group equivalent [g/eq] | Manufacturer | Trade name |
|---|---|---|---|---|---|---|---|
| A-1 | urethane acrylate | acryloyl group | 2 | 6,500 | 3,250 | Nippon Kayaku Co., Ltd. | KAYARADUX-6101 |
| A-2 | urethane acrylate | acryloyl group | 3 | 2,400 | 800 | Mitsubishi Chemical Corp. | SHIKOH UV-7550B |
| A-3 | urethane acrylate | acryloyl group | 2 | 14,000 | 7,000 | Mitsubishi Chemical Corp. | SHIKOH UV-3550AC |
| A-4 | urethane acrylate | acryloyl group | 2 | 3,000 | 1,500 | Mitsubishi Chemical Corp. | SHIKOH UV-6630B |
| A-5 | urethane acrylate | acryloyl group | 4 | 600 | 150 | Daicel-Allnex Ltd | EBECRYL 8210 |
| A-6 | ethoxylated isocyanuric acid triacrylate | acryloyl group | 3 | 423 | 141 | Shin-Nakamura Chemical Co., Ltd. | NK Ester A-9300 |
| A-7 | diacrylate with alicyclic moiety | acryloyl group | 2 | 304 | 152 | Shin-Nakamura Chemical Co., Ltd | NK Ester DCP |
| A-8 | ethoxylated bisphenol A diacrylate | acryloyl group | 2 | 466 | 233 | Shin-Nakamura Chemical Co., Ltd. | NK Ester ABE-300 |
| A-9 | ethoxylated bisphenol A diacrylate | acryloyl group | 2 | 512 | 256 | Shin-Nakamura Chemical Co., Ltd | NK Ester A-BPE-4 |
| A-10 | urethane acrylate | acryloyl group | 2 | 18,000 | 9,000 | Mitsubishi Chemical Corp. | SHIKOH UV-3000B |

Monofunctional Radically Polymerizable Compound (B)

Table 2 presents monofunctional radically polymerizable compounds (B) used in Examples and Comparative examples.

TABLE 2

| | Compound | Manufacturer | Trade name |
|---|---|---|---|
| B-1 | isobornyl methacrylate | Tokyo Chemical Industry Co., Ltd. | Isobornyl Methacrylate |
| B-2 | isobornyl acrylate | Tokyo Chemical Industry Co., Ltd. | Isobornyl Acrylate |
| B-3 | 4-acryloyl morpholine | KJ Chemicals Corp. | ACMO |
| B-4 | N,N-dimethyl acrylamide | KJ Chemicals Corp. | DMAA |
| B-5 | N-phenylmaleimide | Nippon Shokubai Co., Ltd. | IMILEX-P |

Fluororesin Particles (C)

Table 3 presents fluororesin particles (C) used in Examples and Comparative examples.

TABLE 3

| | Compound | Average particle size | Manufacturer | Trade name |
|---|---|---|---|---|
| C-1 | polytetrafluoroethylene | 0.5 μm | Kitamura Ltd. | KTL-500 |
| C-2 | polytetrafluoroethylene | 3.0 μm | Kitamura Ltd. | KTL-2N |
| C-3 | polytetrafluoroethylene | 20 μm | Kitamura Ltd. | KTL-20N |
| C-4 | polytetrafluoroethylene | 200 μm | Mitsubishi Chemical Corp. | Poly(tetrafluoroethylene) Powder 200 μm |

Method for Measuring Average Particle Size

To 20 mL of isopropanol, 1 mg of fluororesin particles was added. The mixture was subjected to dispersion treatment with an ultrasonic disperser for about 3 minutes to prepare a sample. The volume-frequency distribution of the equivalent spherical diameters of the fluororesin particles was measured using Partica LA 950 available from Horiba, Ltd. as a particle size distribution measurement apparatus for a light scattering method (laser diffraction/scattering method). The value at which the cumulative volume frequency of the obtained measurement results was 50% (generally referred to as a median diameter or D50) was defined as the average particle size.

Curing Agent (D)

D-1: Omnirad 819 (available from IGM Resins, photoradical polymerization initiator, bis(2,4,6-trimethylbenzoyl) phenylphosphine oxide)

Fluorine-Containing Surface Modifier

E-1: Megaface RS-76-NS (available from DIC Corp., UV-curable surface modifier). This is a mixture of 20 parts by mass of a fluorine-containing radical polymerizable compound and 80 parts by mass of dipropylene glycol diacrylate, and the fluorine-containing radical polymerizable compound is in a dissolved state.

Example 1

Preparation of Photocurable Resin Composition

The components were mixed together in accordance with the formulation given in Table 4, and the mixture was heated to 70 °C and stirred with a stirrer for 1 hour to prepare a photocurable resin composition.

The polyfunctional radically polymerizable compound (A) content described in Table 4 represents the polyfunctional radically polymerizable compound (A) content in parts by mass based on a total of 100 parts by mass of the polyfunctional radically polymerizable compound (A) and the monofunctional radically polymerizable compound (B). Similarly, the monofunctional radically polymerizable compound (B) content represents the monofunctional radically polymerizable compound (B) content in parts by mass based on a total of 100 parts by mass of the polyfunctional radically polymerizable compound (A) and the monofunctional radically polymerizable compound (B). The amount of fluororesin particles (C) contained represents the amount of fluororesin particles (C) contained in parts by mass based on a total of 100 parts by mass of the polyfunctional radically polymerizable compound (A) and the monofunctional radically polymerizable compound (B).

Example 1 is an example in which a single type of polyfunctional radically polymerizable compound was contained as the polyfunctional radically polymerizable compound (A). The polyfunctional radically polymerizable compound (A) has an ethylenically unsaturated group equivalent of 3,250 g/eq.

Preparation of Test Specimen X

A test specimen was prepared from the prepared photocurable resin composition by the following method. A mold having a length of 80 mm, a width of 10 mm, and a thickness of 4 mm was interposed between two sheets of quartz glass, and the photocurable resin composition was poured into the mold. The poured photocurable resin composition was irradiated with ultraviolet light at 5 mW/cm$^2$ from both surfaces of the mold for 360 seconds using an ultraviolet irradiation device (trade name "Light Source Execure 3000", available from Hoya Candeo Optronics Corp.), thereby resulting in a cured product. The total energy applied to cure the photocurable resin composition was 3,600 mJ/cm$^2$. The resulting cured product was placed in a heating oven at 50 °C, subjected to heat treatment for 1 hour, placed in a heating oven at 100 °C, and subjected to heat treatment for 2 hours, thereby resulting in a test specimen X having a length of 80 mm, a width of 10 mm, and a thickness of 4 mm. The test specimen X was used for a Charpy impact test described below.

Preparation of Test Specimen Y

A three-dimensional object was formed from the prepared photocurable resin composition in accordance with slice data based on the three-dimensional shape of a rectangular parallelepiped having a size of 30 mm×30 mm×4 mm with a 3D printer (Figure 4 Modular, available from 3D Systems, Inc., a stereolithography apparatus using a constrained surface method). The three-dimensional object was produced by laminating cured layers each measuring 30 mm×4 mm×50 μm in thickness to a height of 30 mm. The resulting three-dimensional object was irradiated with ultraviolet light for 90 minutes using an LC-3D Print Box UV Post-Cure Unit available from 3D Systems, Inc., thereby producing a test specimen Y. The test specimen Y was used for the evaluations of the formability, the coefficient of friction, and the wear resistance described below.

Evaluation

Formability

The success or failure of shaping was evaluated by the dimensional error of the test specimen Y, which is the error against the shape of 30 mm×30 mm×4 mm. The evaluation criteria are as follows: When the evaluation criterion B is satisfied, the formability is determined to be good, and when the evaluation criterion A is satisfied, the formability is determined to be excellent. Dimensional measurement of each side was performed after shaping with a 3D printer and before post-curing with ultraviolet light. Table 4 presents the results.

A: The dimensional error is within ±3%.

B: The dimensional error is more than ±3% and within ±20%.

C: Unable to shape.

The expression "unable to shape" used here indicates that a significant defect occurs, for example, the three-dimensional object falls off from the build platform during the shaping of the test specimen Y.

Specific Wear Rate and Coefficient of Friction

The measurements of the specific wear rate and the coefficient of friction were performed in accordance with JIS K 7218 A under the following conditions.

Measurement Instrument: Friction and wear tester MODEL EMF-III-F, available from A&D Company, Ltd.

Test environment: 23 °C±2 °C, humidity 50% RH±5% RH

Test specimen: test specimen Y (size: 30 mm×30 mm, thickness: 4 mm)

Mating material: made of S45C, ring shape, surface roughness: about 0.8 μm Ra, contact area: 2 $cm^2$ Load: 50 N Sliding speed: 50 cm/s Test time: 100 minutes Sliding distance: 3 Km (1) Specific Wear Rate A mating material was pressed against the 30 mm×30 mm surface of the test specimen Y with the above load, and slid at the above speed. The sliding was stopped after 100 minutes, and the wear mass was measured from the mass of the test specimen Y before and after the sliding. The wear volume was calculated from the measured wear mass and the specific gravity of the test specimen Y. The value obtained by dividing the calculated wear volume by the sliding distance and the load was defined as the specific wear rate (unit: $mm^3 \cdot N^{-1} \cdot Km^{-1}$), which was used as an index of the wear resistance. The evaluation criteria for wear resistance are described below. When the wear depth was more than 1.5 mm within 100 minutes after the start of sliding, the evaluation was C as the measurement limit. When the evaluation criterion B is satisfied, the wear resistance is determined to be good. When the evaluation criterion A is satisfied, the wear resistance is determined to be excellent. Table 4 presents the results.

A: Less than 0.5 $mm^3 \cdot N^{-1} \cdot Km^{-1}$.

B: 0.5 $mm^3 \cdot N^{-1} \cdot Km^{-1}$ or more and less than 1.0 $mm^3 \cdot N^{-1} \cdot Km^{-1}$.

C: 1.0 $mm^3 \cdot N^{-1} \cdot Km^{-1}$ or more.

(2) Coefficient of Friction

The coefficient of friction was defined as a value obtained by dividing the average value of the friction force for 10 seconds before and after 60 minutes from the start of sliding by the load. The evaluation criteria for the coefficient of friction are described below. When the evaluation criterion B is satisfied, the coefficient of friction is determined to be good. When the evaluation criterion A is satisfied, the coefficient of friction is determined to be excellent. Table 4 presents the results.

A: Less than 0.5.

B: 0.5 or more and less than 1.0.

C: 1.0 or more.

Charpy Impact Test

According to JIS K 7111, a notch having a depth of 2 mm and an angle of 45° was formed in the central portion of the test specimen X by a notch-forming machine (trade name: "Notching Tool A-4", available from Toyo Seiki Seisaku-sho, Ltd.). Using an impact tester (trade name: "IMPACT TESTER IT", available from Toyo Seiki Seisaku-sho, Ltd.), fracture is performed from the back surface of the notch of the test specimen with an energy of 0.5 J. The energy required for fracture was calculated from the angle at which the hammer, which was swung up to 150 °, swung up after the fracture of the test specimen, and this was defined as the Charpy impact strength and used as an index of toughness. When the test specimen X was broken at the time of notching, the Charpy impact strength was set to 0.0 kJ/$m^2$. The evaluation criteria of toughness are described below. When the evaluation criterion B is satisfied, the toughness is determined to be good. When the evaluation criterion A is satisfied, the toughness is determined to be excellent. Table 4 presents the results.

A: 3.0 kJ/$m^2$ or more.

B: 1.0 kJ/$m^2$ or more and less than 3.0 kJ/$m^2$.

C: Less than 1.0 kJ/$m^2$.

Examples 2 to 6 and Comparative Examples 1 to 4

Photocurable resin compositions were prepared in the same manner as in Example 1, except that the type or amount of each component contained was changed as given in Table 4, and were evaluated in the same manner as in Example 1. Table 4 presents the results.

Examples 2 to 6 and Comparative examples 1 to 4 are each an example in which a single type of polyfunctional radically polymerizable compound is contained as the polyfunctional radically polymerizable compound (A). The ethylenically unsaturated group equivalent of the polyfunctional radically polymerizable compound (A) is 3,250 g/eq.

TABLE 4

| | | | Example | | | | |
|---|---|---|---|---|---|---|---|
| | | | 1 | 2 | 3 | 4 | 5 |
| Resin composition | Polyfunctional radically polymerizable compound (A) | A-1 [part by mass] | 55.0 | 55.0 | 55.0 | 55.0 | 55.0 |
| | | Ethylenically unsaturated group equivalent [g/eq] | 3,250 | 3,250 | 3,250 | 3,250 | 3,250 |
| | Monofunctional radically polymerizable compound (B) | B-1 [part by mass] | 45.0 | 45.0 | 45.0 | 45.0 | 45.0 |
| | Fluororesin particles (C) | C-1 [part by mass] | 10.0 | — | — | — | — |
| | | C-2 [part by mass] | — | — | 5.0 | 10.0 | 20.0 |
| | | C-3 [part by mass] | — | 10.0 | — | — | — |

TABLE 4-continued

| | | | | | | | |
|---|---|---|---|---|---|---|---|
| | | C-4 [part by mass] | — | — | — | — | — |
| | Curing agent (D) | D-1 [part by mass] | 1.0 | 1.0 | 1.0 | 1.0 | 1.0 |
| | Fluorine-containing surface modifier | E-1 [part by mass] | — | — | — | — | — |
| Evaluation | Formability | Evaluation | B | B | A | A | A |
| | Specific wear rate | Measured value [$mm^3 \cdot N^{-1} \cdot km^{-1}$] | 0.49 | 0.64 | 0.74 | 0.69 | 0.75 |
| | | Evaluation | A | B | B | B | B |
| | Coefficient of friction | Measured value | 0.31 | 0.31 | 0.78 | 0.49 | 0.35 |
| | | Evaluation | A | A | B | A | A |
| | Charpy impact strength | Measured value [$kJ/m^2$] | 2.7 | 2.5 | 3.2 | 3.2 | 2.4 |
| | | Evaluation | B | B | A | A | B |

| | | | Example | Comparative example | | | |
|---|---|---|---|---|---|---|---|
| | | | 6 | 1 | 2 | 3 | 4 |
| Resin composition | Polyfunctional radically polymerizable compound (A) | A-1 [part by mass] | 55.0 | 55.0 | 55.0 | 55.0 | 55.0 |
| | | Ethylenically unsaturated group equivalent [g/eq] | 3,250 | 3,250 | 3,250 | 3,250 | 3,250 |
| | Monofunctional radically polymerizable compound (B) | B-1 [part by mass] | 45.0 | 45.0 | 45.0 | 45.0 | 45.0 |
| | Fluororesin particles (C) | C-1 [part by mass] | — | — | — | — | — |
| | | C-2 [part by mass] | 30.0 | — | 40.0 | — | — |
| | | C-3 [part by mass] | — | — | — | — | — |
| | | C-4 [part by mass] | — | — | — | 10.0 | — |
| | Curing agent (D) | D-1 [part by mass] | 1.0 | 1.0 | 1.0 | 1.0 | 1.0 |
| | Fluorine-containing surface modifier | E-1 [part by mass] | — | — | — | — | 20.0 |
| Evaluation | Formability | Evaluation | B | A | C | C | A |
| | Specific wear rate | Measured value [$mm^3 \cdot N^{-1} \cdot km^{-1}$] | 0.70 | Measurement limit | — | — | 1.51 |
| | | Evaluation | B | C | — | — | C |
| | Coefficient of friction | Measured value | 0.30 | 1.12 | — | — | 0.78 |
| | | Evaluation | A | C | — | — | B |
| | Charpy impact strength | Measured value [$kJ/m^2$] | 1.9 | 3.5 | — | — | 3.8 |
| | | Evaluation | B | A | — | — | A |

Examples 7 to 17 and Comparative Examples 5 to 9

Photocurable resin compositions were prepared in the same manner as in Example 1, except that the type or amount of each component contained was changed as given in Tables 5 and 6, and were evaluated in the same manner as in Example 1. Table 5 presents the results.

Examples 10 to 16 and Comparative example 6 are each an example in which multiple polyfunctional radically polymerizable compounds are contained as the polyfunctional radically polymerizable compound (A). In each of Examples 10 to 13, 15, and 16, a mixture of a polyfunctional radically polymerizable compound having an ethylenically unsaturated group equivalent of 700 g/eq or more and 7,000 g/eq or less and a polyfunctional radically polymerizable compound having an ethylenically unsaturated group equivalent of less than 700 g/eq is used. In Example 14, a mixture of a polyfunctional radically polymerizable compound having an ethylenically unsaturated group equivalent of 700 g/eq or more and 7,000 g/eq or less and a polyfunctional radically polymerizable compound having an ethylenically unsaturated group equivalent of more than 7,000 g/eq is used. In each of Examples 10 to 16, as given in Tables 5 and 6, the mixing ratio is adjusted in such a manner that the ethylenically unsaturated group equivalent is 700 g/eq or more and 7,000 g/eq or less. In Comparative example 6, a polyfunctional radically polymerizable compound (A) having an ethylenically unsaturated group equivalent of less than 700 g/eq is used.

In Example 8, 57.1 parts by mass of "SHIKOH UV 3550AC" (40 parts by mass of urethane acrylate and 17.1 parts by mass of B-3), 30 parts by mass of B-2, and another 12.9 parts by mass of B-3 were used. In the resin compositions in Table 5, the urethane acrylate component in A-3 is described as parts by mass of the polyfunctional radically polymerizable compound (A), and the total amount of B-3 in A-3 and additional B-3 is described as parts by mass of the monofunctional radically polymerizable compound (B).

In Comparative example 5, a single type of urethane acrylate having an ethylenically unsaturated group equivalent of 150 g/eq is contained as the polyfunctional radically polymerizable compound (A). In Comparative example 7, a single type of urethane acrylate having an ethylenically unsaturated group equivalent of 9,000 g/eq is contained as the polyfunctional radically polymerizable compound (A). In Comparative example 8, the polyfunctional radically polymerizable compound (A) content is 15 parts by mass based on 100 parts by mass of a total of the polyfunctional radically polymerizable compound (A) and the monofunctional radically polymerizable compound (B), and in Comparative example 9, the content is 80 parts by mass.

TABLE 5

| | | | Example | | | | |
|---|---|---|---|---|---|---|---|
| | | | 7 | 8 | 9 | 10 | 11 |
| Resin composition | Polyfunctional radically polymerizable compound (A) | A-2 [part by mass] | 40.0 | — | — | — | — |
| | | A-3 [part by mass] | — | 40.0 | — | — | — |
| | | A-4 [part by mass] | — | — | 40.0 | 40.0 | 40.0 |
| | | A-5 [part by mass] | — | — | — | — | — |
| | | A-6 [part by mass] | — | — | — | — | — |
| | | A-7 [part by mass] | — | — | — | 15.0 | 15.0 |
| | | A-8 [part by mass] | — | — | — | 20.0 | — |
| | | A-9 [part by mass] | — | — | — | — | 20.0 |
| | | A-10 [part by mass] | — | — | — | — | — |
| | | Ethylenically unsaturated group equivalent [g/eq] | 800 | 7,000 | 1,500 | 893 | 899 |
| | Monofunctional radically polymerizable compound (B) | B-1 [part by mass] | — | — | — | — | — |
| | | B-2 [part by mass] | 30.0 | 30.0 | 30.0 | — | — |
| | | B-3 [part by mass] | 30.0 | 30.0 | 30.0 | — | — |
| | | B-4 [part by mass] | — | — | — | 25.0 | 25.0 |
| | | B-5 [part by mass] | — | — | — | — | — |
| | Fluororesin particles (C) | C-2 [part by mass] | 10.0 | 10.0 | 10.0 | 10.0 | 10.0 |
| | Curing agent (D) | D-1 [part by mass] | 1.0 | 1.0 | 1.0 | 1.0 | 1.0 |
| Evaluation | Formability | Evaluation | A | A | A | A | A |
| | Specific wear rate | Measured value [$mm^3 \cdot N^{-1} \cdot km^{-1}$] | 0.64 | 0.69 | 0.69 | 0.71 | 0.78 |
| | | Evaluation | B | B | B | B | B |
| | Coefficient of friction | Measured value | 0.52 | 0.69 | 0.57 | 0.51 | 0.48 |
| | | Evaluation | B | B | B | B | A |
| | Charpy impact strength | Measured value [$KJ/m^2$] | 1.3 | 4.9 | 2.9 | 2.7 | 3.1 |
| | | Evaluation | B | A | B | B | A |

| | | | Example | | Comparative example | | |
|---|---|---|---|---|---|---|---|
| | | | 12 | 13 | 5 | 6 | 7 |
| Resin composition | Polyfunctional radically polymerizable compound (A) | A-2 [part by mass] | — | — | — | — | — |
| | | A-3 [part by mass] | — | — | — | — | — |
| | | A-4 [part by mass] | 40.0 | 40.0 | — | — | — |
| | | A-5 [part by mass] | — | — | 55.0 | — | — |

TABLE 5-continued

| | | | | | | | |
|---|---|---|---|---|---|---|---|
| | | A-6 [part by mass] | — | — | — | 13.7 | — |
| | | A-7 [part by mass] | 2.5 | 15.0 | — | — | — |
| | | A-8 [part by mass] | — | 10.0 | — | — | — |
| | | A-9 [part by mass] | — | — | — | 41.3 | — |
| | | A-10 [part by mass] | — | — | — | — | 55.0 |
| | | Ethylenically unsaturated group equivalent [g/eq] | 1,421 | 994 | 150 | 227 | 9,000 |
| | Monofunctional radically polymerizable compound (B) | B-1 [part by mass] | — | — | 45.0 | 45.0 | 45.0 |
| | | B-2 [part by mass] | — | — | — | — | — |
| | | B-3 [part by mass] | 37.5 | 35.0 | — | — | — |
| | | B-4 [part by mass] | — | — | — | — | — |
| | | B-5 [part by mass] | 20.0 | — | — | — | — |
| | Fluororesin particles (C) | C-2 [part by mass] | 10.0 | 10.0 | 10.0 | 10.0 | 10.0 |
| | Curing agent (D) | D-1 [part by mass] | 1.0 | 1.0 | 1.0 | 1.0 | 1.0 |
| Evaluation | Formability | Evaluation | B | A | A | A | C |
| | Specific wear rate | Measured value [$mm^3 \cdot N^{-1} \cdot km^{-1}$] | 0.71 | 0.47 | 0.64 | 0.70 | — |
| | | Evaluation | B | A | B | B | — |
| | Coefficient of friction | Measured value | 0.61 | 0.49 | 0.58 | 0.61 | — |
| | | Evaluation | B | A | B | B | — |
| | Charpy impact strength | Measured value [$KJ/m^2$] | 4.0 | 2.4 | 0.7 | 0.8 | — |
| | | Evaluation | A | B | C | C | — |

TABLE 6

| | | | Example | | | | Comparative example | |
|---|---|---|---|---|---|---|---|---|
| | | | 14 | 15 | 16 | 17 | 8 | 9 |
| Resin composition | Polyfunctional radically polymerizable compound (A) | A-1 [part by mass] | — | — | — | 20.0 | 15.0 | 80.0 |
| | | A-2 [part by mass] | 30.0 | — | — | — | — | — |
| | | A-4 [part by mass] | — | 40.0 | 40.0 | — | — | — |
| | | A-7 [part by mass] | — | 15.0 | 15.0 | — | — | — |
| | | A-8 [part by mass] | — | 5.0 | 5.0 | — | — | — |
| | | A-10 [part by mass] | 30.0 | — | — | — | — | — |
| | | Ethylenically unsaturated group equivalent [g/eq] | 4900 | 994 | 994 | 3250 | 3250 | 3250 |
| | Monofunctional radically polymerizable compound (B) | B-3 [part by mass] | 40.0 | — | — | 30.0 | 30.0 | 20.0 |
| | | B-5 [part by mass] | — | — | — | 30.0 | 30.0 | — |
| | | B-6 [part by mass] | — | 40.0 | — | 20.0 | 25.0 | — |
| | | B-7 [part by mass] | — | — | 40.0 | — | — | — |
| | Fluororesin particles (C) | C-2 [part by mass] | 10.0 | 10.0 | 10.0 | 10.0 | 10.0 | 10.0 |
| | Curing agent (D) | D-1 [part by mass] | 1.0 | 1.0 | 1.0 | 1.0 | 1.0 | 1.0 |

TABLE 6-continued

| | | | Example | | | | Comparative example | |
|---|---|---|---|---|---|---|---|---|
| | | | 14 | 15 | 16 | 17 | 8 | 9 |
| Evaluation | Formability | Evaluation | A | A | A | A | A | C |
| | Specific wear rate | Measured value [$mm^3 \cdot N^{-1} \cdot km^{-1}$] | 0.62 | 0.48 | 0.59 | 0.52 | 0.51 | — |
| | | Evaluation | B | A | B | B | B | — |
| | Coefficient of friction | Measured value | 0.59 | 0.49 | 0.62 | 0.52 | 0.54 | — |
| | | Evaluation | B | A | B | B | B | — |
| | Charpy impact strength | Measured value [$KJ/m^2$] | 3.1 | 3.8 | 4.0 | 1.2 | 0.9 | — |
| | | Evaluation | A | A | A | B | C | — |

As can be seen from Tables 4 to 6, all of Examples 1 to 17 according to the present embodiment exhibited good formability. In the test specimens produced by curing the photocurable resin composition according to the present embodiment, each test specimen X had a Charpy impact strength of 1.0 $KJ/m^2$ or more, and each test specimen Y had a coefficient of friction of less than 1.0 and a specific wear rate of less than 1.0 $mm^3 \cdot N^{-1} \cdot Km^{-1}$. That is, the results indicated that the cured products having both good toughness and good sliding properties were obtained by using the photocurable resin compositions according to the present embodiment.

The results of Table 4 indicated that in Comparative example 1 in which the fluororesin particles (C) were not added, the specific wear rate and the coefficient of friction did not satisfy the evaluation criteria B. In Comparative example 2 in which the amount of fluororesin particles (C) added was 40 parts by mass, the viscosity increased, making it impossible to produce a cured product. From these results and the results of Examples 1 to 6, the amount of fluororesin particles (C) added can be 5 parts or more by mass and 30 parts or less by mass based on a total of 100 parts by mass of the polyfunctional radically polymerizable compound (A) and the monofunctional radically polymerizable compound (B).

When the average particle size of the fluororesin particles (C) added is not sufficiently small with respect to the thickness of each of the laminated layers in the shaping using the 3D printer, the adhesion at the interface between the laminated layers should be affected. In Comparative example 3 in which C-4 (200 μm) was used as the fluororesin particles (C), the criterion B was not satisfied in terms of formability. Although it depends on the specifications of the apparatus used for shaping and shaping conditions, the average particle size of the fluororesin particles (C) can be 20 μm or less in view of the fact that good modeling accuracy was obtained in Examples 1 to 6.

In Comparative Example 4 in which the fluorine-containing surface modifier E-1 was used instead of the fluororesin particles (C), the evaluation criterion B was not satisfied in terms of the specific wear rate. This result and the results of Examples 1 to 6 indicated that fluororesin particles containing fluorine and not soluble in the mixture of the polyfunctional radically polymerizable compound (A) and the monofunctional radically polymerizable compound (B) can be used.

From the results presented in Tables 4 to 6, in Examples 1 to 17 in which the ethylenically unsaturated group equivalent of the polyfunctional radically polymerizable compound (A) contained in the photocurable resin composition was 700 g/eq or more and 7,000 g/eq or less, all the items were good. In Comparative examples 5 and 6 in which the ethylenically unsaturated group equivalent of the polyfunctional radically polymerizable compound (A) contained in the photocurable resin composition was less than 700 g/eq, however, the Charpy impact strength did not satisfy the evaluation criterion B, and good toughness was not obtained. In Comparative example 7 in which the ethylenically unsaturated group equivalent was more than 7,000 g/eq, the formability was poor, and the evaluation criterion B was not satisfied. These results indicated that the ethylenically unsaturated group equivalent of the polyfunctional radically polymerizable compound (A) can be 700 g/eq or more and 7,000 g/eq or less.

From the results presented in Tables 4 to 6, when the amount of polyfunctional radically polymerizable compound (A) was 20 parts or more by mass and 75 parts or less by mass based on a total of 100 parts by mass of the polyfunctional radically polymerizable compound (A) and the monofunctional radically polymerizable compound (B) contained in the photocurable resin composition, all the items were good. In Comparative example 8 in which the polyfunctional radically polymerizable compound (A) was contained in an amount of less than 20 parts by mass, however, the reference value of the Charpy impact strength was not satisfied, and good toughness was not obtained. In Comparative example 9 in which the amount of polyfunctional radically polymerizable compound (A) was more than 75 parts by mass, the viscosity was too high, thus making it difficult to perform shaping. These results indicated that the polyfunctional radically polymerizable compound (A) can be contained in an amount of 20 parts or more by mass and 75 parts or less by mass.

By using the photocurable resin composition according to the present embodiment in a method for manufacturing a three-dimensional object using stereolithography, a three-dimensional object having excellent toughness and sliding properties can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-115655 filed Jul. 20, 2022 and No. 2023-071495 filed Apr. 25, 2023, which are hereby incorporated by reference herein in their entirety.

What is claimed is:

1. A photocurable resin composition, comprising:

a polyfunctional radically polymerizable compound (A);

a monofunctional radically polymerizable compound (B);

particles that are the only particles in the photocurable resin composition; and a curing agent (D), wherein the polyfunctional radically polymerizable compound (A) has an ethylenically unsaturated group equivalent of 700 g/eq or more and 7,000 g/eq or less, the polyfunctional radically polymerizable compound (A) is contained in an amount of 20 parts or more by mass and 75 parts or less by mass based on a total of 100 parts by mass of the polyfunctional radically polymerizable compound (A) and the monofunctional radically polymerizable compound (B), the particles are fluororesin particles (C) each of which contains a fluororesin in whole or in part thereof, the fluororesin particles (C) are contained in an amount of 5 parts or more by mass and 30 parts or less by mass based on the total of 100 parts by mass of the polyfunctional radically polymerizable compound (A) and the monofunctional radically polymerizable compound (B), and the fluororesin particles (C) have an average particle size of 0.5 or more and 50 μm or less.

2. The photocurable resin composition according to claim 1, wherein the polyfunctional radically polymerizable compound (A) is a single polyfunctional radically polymerizable compound.

3. The photocurable resin composition according to claim 1, wherein the polyfunctional radically polymerizable compound (A) is a mixture containing multiple polyfunctional radically polymerizable compounds and has an ethylenically unsaturated group equivalent of 700 g/eq or more and 7,000 g/eq or less, the ethylenically unsaturated group equivalent being determined by weighted-averaging individual ethylenically unsaturated group equivalents of the multiple polyfunctional radically polymerizable compounds with respective ratios by mass of the multiple polyfunctional radically polymerizable compounds.

4. The photocurable resin composition according to claim 3, wherein the polyfunctional radically polymerizable compound (A) is a mixture of a polyfunctional radically polymerizable compound having an ethylenically unsaturated group equivalent of 700 g/eq or more and 7,000 g/eq or less and a polyfunctional radically polymerizable compound having an ethylenically unsaturated group equivalent of less than 700 g/eq.

5. The photocurable resin composition according to claim 1, wherein the polyfunctional radically polymerizable compound (A) is a (meth)acrylate compound or a urethane (meth)acrylate compound having any of a polyether structure, a polyester structure, and a polycarbonate structure.

6. The photocurable resin composition according to claim 1, wherein the monofunctional radically polymerizable compound (B) is selected from acrylamide compounds, (meth) acrylate compounds, maleimide compounds, and N-vinyl compounds.

7. The photocurable resin composition according to claim 1, wherein the curing agent (D) is at least a photoradical polymerization initiator.

8. The photocurable resin composition according to claim 1, wherein the polyfunctional radically polymerizable compound (A) has any of a polyether structure, a polyester structure, and a polycarbonate structure.

9. The photocurable resin composition according to claim 1, wherein the polyfunctional radically polymerizable compound (A) is a (meth)acrylate compound or a urethane (meth)acrylate compound.

10. The photocurable resin composition according to claim 1, wherein the fluororesin particles (C) are substantially insoluble in a mixture of the polyfunctional radically polymerizable compound (A) and the monofunctional radically polymerizable compound (B).

11. The photocurable resin composition according to claim 1, wherein the fluororesin particles (C) contain a fluororesin on surfaces of the fluororesin particles (C).

12. The photocurable resin composition according to claim 1, wherein the fluororesin particles (C) are selected from the group consisting of tetrafluoroethylene polymers, trifluorochloroethylene polymers, vinylidene fluoride polymers, vinyl fluoride polymers, trifluorochloroethylene-ethylene copolymers, tetrafluoroethylene-hexafluoropropylene copolymers, tetrafluoroethylene-perfluoroalkyl vinyl ether copolymers, tetrafluoroethylene-perfluorodioxole copolymers, tetrafluoroethylene-perfluoromethyl vinyl ether copolymers, vinylidene fluoride-hexafluoropropylene copolymers, tetrafluoroethylene-perfluoro[2-(fluorosulfonylethoxy) propyl vinyl ether] copolymers, tetrafluoroethylene-ethylene copolymers, and tetrafluoroethylene-propylene copolymers.

13. The photocurable resin composition according to claim 1, wherein the fluororesin particles (C) are tetrafluoroethylene polymers or tetrafluoroethylene-hexafluoropropylene copolymers.

14. The photocurable resin composition according to claim 1, wherein a total amount of the polyfunctional radically polymerizable compound (A), the monofunctional radically polymerizable compound (B), and the fluororesin particles (C) is 75 parts or more by mass and 100 parts or less by mass based on 100 parts by mass of the photocurable resin composition excluding the curing agent (D).

15. A method for manufacturing a three-dimensional object using stereolithography, the method comprising the steps of:

disposing a photocurable resin composition in a layer; and irradiating the layered photocurable resin composition with light energy based on slice data of a shaping model to cure the layered photocurable resin composition, wherein the photocurable resin composition is the photocurable resin composition according to claim 1.

16. The method for manufacturing a three-dimensional object according to claim 15, further comprising a step of performing heat treatment after the step of irradiating the photocurable resin composition with the light energy.

17. The method for manufacturing a three-dimensional object according to claim 15, wherein the light energy is light emitted from a laser light source or a projector.

* * * * *